INVENTORS
JOHN E. COOLIDGE
ROBERT J. S. BROWN
BY *Frank E. Johnston*
*Ralph L. Freeland Jr.*
ATTORNEYS

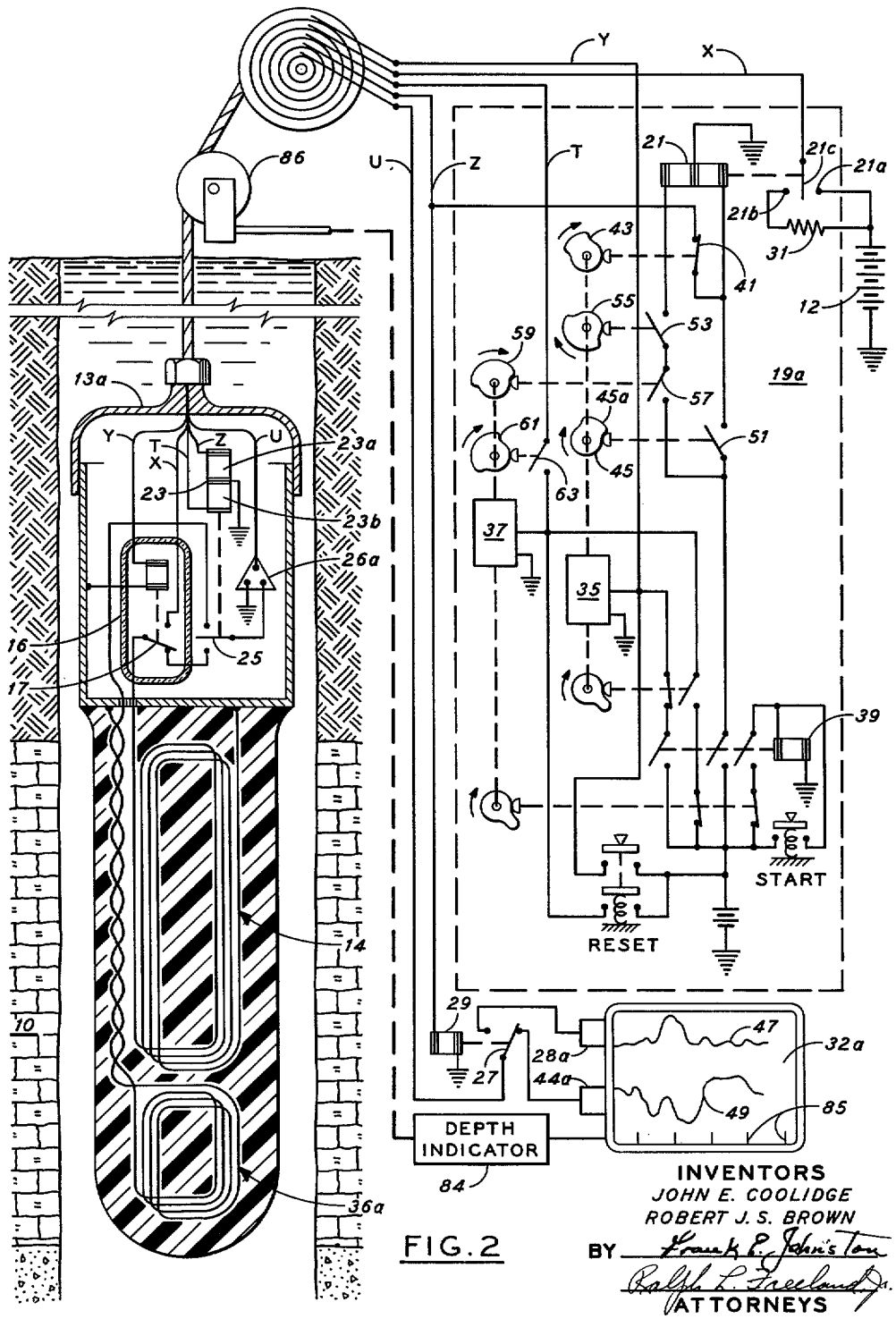

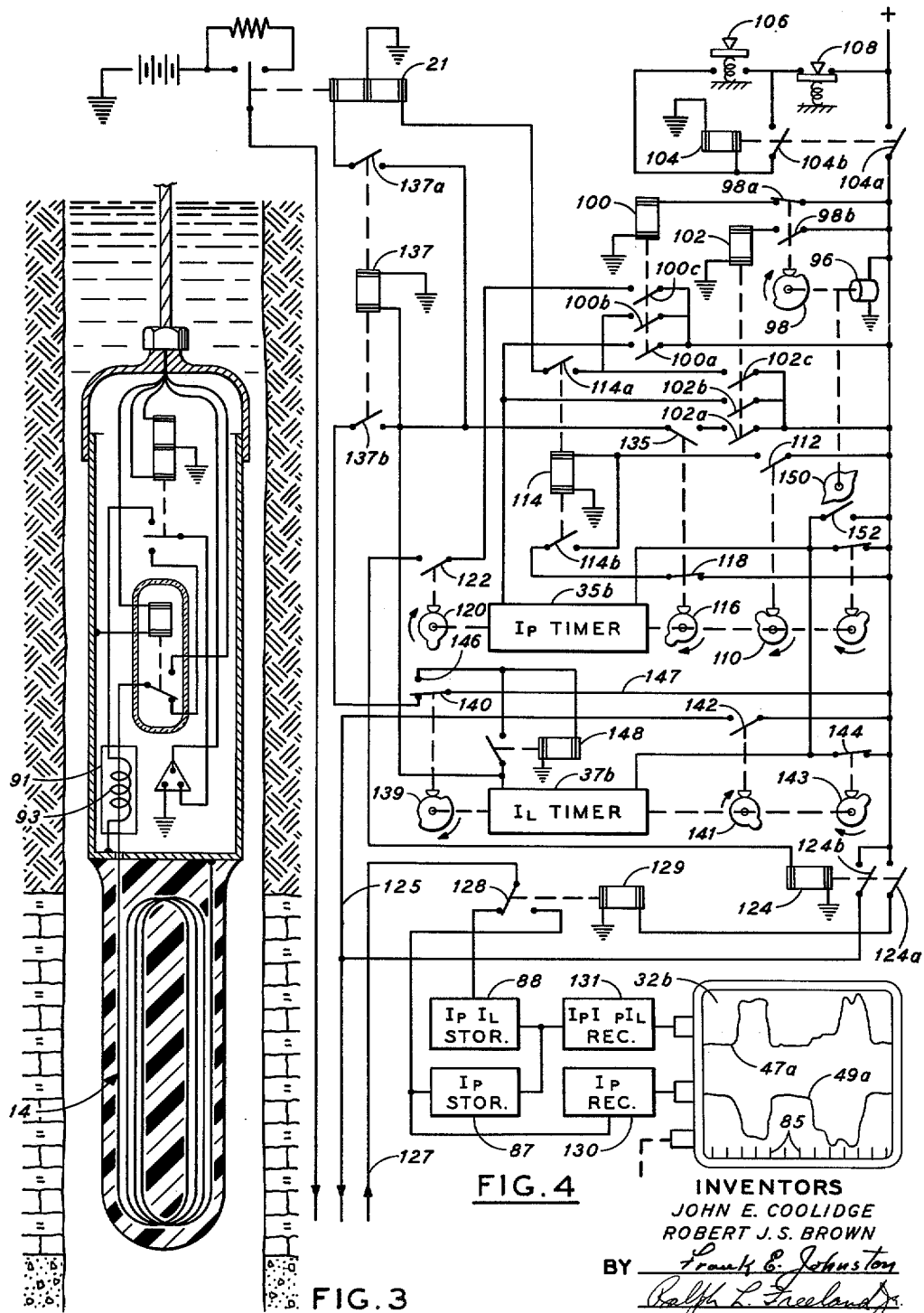

United States Patent Office 3,004,212
Patented Oct. 10, 1961

3,004,212
INDUCTION AND NUCLEAR MAGNETISM LOGGING
John E. Coolidge, Arlington Heights, Ill., and Robert J. S. Brown, Fullerton, Calif., assignors, by direct and mesne assignments, of one-half to Borg-Warner Corporation, Chicago, Ill., a corporation of Illinois, and one-half to California Research Corporation, San Francisco, Calif., a corporation of Delaware
Filed Apr. 16, 1959, Ser. No. 806,831
12 Claims. (Cl. 324—.5)

The present invention relates to nuclear magnetism well bore logging. More particularly, it relates to a method of distinguishing oil from water in earth formations traversed by a well bore by detecting the influence of such formations upon electrical currents mutually induced in a nuclear magnetism polarizing coil and in said formations when protons are caused to precess in phase in the formation.

The present invention has for an object distinguishing oil from water by inducing a nuclear magnetism signal from fluids in an earth formation around a well bore while simultaneously detecting an electrical signal originating from electrical current transients in the nuclear magnetism polarizing coil influenced by the electromagnetic loading of said formation on said coil while said transients are present therein.

In drilling oil wells, particularly exploratory or wildcat wells, it is almost universal practice to use a water-based drilling fluid. Such water-based fluid is used in part so that a conventional electical log comprising a self-potential and one or more resistivity logs can be made in the well bore. As is well known in the art, where almost ideal conditions prevail the combination of self-potential and resistivity logs permits oil to be distinguished from water, and reservoir rocks to be distinguished from nonfluid-containing rocks, such as shales and the like. In general, these logs are interpreted by comparing increases in resistivity with increases in self-potential. The resistivity curve reads high for oil, non-fluid rocks, and fresh water. The curve reads low for salt water. The self-potential log, on the other hand, reads high for all fluid-containing rocks and low for nonfluid-bearing formations in the normal circumstance where the drilling fluid is less saline than the formation waters. Accordingly, when resistivity is high, there is a fair inference that oil or fresh water is present. The inference of fresh water is easily ruled out when the formation is at a sufficient depth so that fresh water is unlikely.

As mentioned above, electric logging is the most commonly used exploratory well log. In many sedimentary rocks, especially those that may contain petroleum, the oil is partially flushed away by the drilling fluid, so that after drilling there is less oil present adjacent the well bore. While this difficulty is not serious as far as the logging result is concerned, it may easily damage the well so that its full petroleum-producing potential cannot be obtained. One reason for this is that such rocks frequently contain clay materials that swell when contacted by water. This swelling tends to block the pore spaces around the well to a depth sufficient to reduce the oil permeability of the rock around the well bore.

Another difficulty frequently encountered in using water-based fluids is the necessity for keeping the water as fresh as possible. This problem arises because the conductivity of the drilling fluid changes rapidly with salt content that may be picked up during drilling. In many locations it is difficult to obtain sufficient fresh water to keep the salt content down. The primary difficulty with increasing salt content in the drilling fluid is that the self-potential will be low, so that few, if any, pronounced variations appear in the curve.

For the foregoing reasons, it has long been desired to drill exploratory wells with an oil-based drilling fluid. The primary difficulty, of course, is that the oil-based fluid is an insulator so that conventional electric logging cannot be performed in a well so drilled. Induction logs give information comparable to a resistivity log, but unless a complicated arrangement of coils is used, or multiple runs made in the well bore, the information comparable to the three different resistivity logs, made with three simple electrodes in electric logging, cannot be fully developed. However, this difficulty is not insurmountable. The main problem has been that no curve comparable to the self-potential curve is available. Some attempts have been made to substitute a neutron-neutron or a neutron-gamma ray log (popularly known simply as a neutron log) for this fluid measurement. The prime difficulty with a neutron log is that it cannot distinguish protons that are bound to the rock structure, as occurs in many shales, and those in free fluid, such as water and oil. Accordingly, the neutron log will not produce a reading comparable to the self-potential log in electric logging.

It is known that nuclear magnetism logging can be used to distinguish oil and water directly in an earth formation. However, one of the problems in so doing is the necessity for developing a series of measurements adjacent the suspected fluid-containing formation by a system known as relaxation function determination providing information about the fluid. This information is developed by positioning a nuclear magnetism polarizing coil in the well bore adjacent the formation. The polarizing current is then passed through the coil to polarize on a macroscopic basis a large statistical sample of the protons present in the formation fluids. The field is then abruptly interrupted and a signal detected either in the polarizing coil or in a separate signal-receiving coil. This signal is generated in the coil by the protons precessing in phase under the influence of the earth's magnetic field. The amplitude of this precession signal indicates the quantity of fluid protons in the formation. Where it is desired to know the type of protons, that is, to know whether they are in the form of hydrocarbons or water, it is essential that the polarizing field be applied a succession of times and changed either in intensity or in duration, and the resulting signal measured a similar plurality of times. The relaxation rate, that is, the rate at which the proton polarization generating the induced signals changes in magnitude with time and/or magnetic field intensity, can frequently be used as a direct means to identify whether the protons are in oil or in water. The difficulty with this system is the amount of time required at each station in a well bore to make a sufficient number of measurements to diagnose the possible oil content of a signal-producing formation. It has been learned from experimental runs that no signal is produced by protons bound in the rock matrix of shales and the like. Further, it has been found that the signal is definitely a function of the freedom of the fluid within the earth formation to flow.

From the foregoing discussion, it is apparent that a log that will permit simultaneous measurement of the free fluid content and the electrical resistivity properties of a formation containing free fluid will permit an accurate distinction between oil and water in a well bore. Prior to the present invention, however, it has been necessary to make separate logging runs with separate logging tools to develop two different forms of information that must be correlated together to permit an accurate diagnosis of whether fluid is present and whether that fluid is oil or water. Such determination, in accordance with the invention, can be made independently of whether the measurements are made in oil-, water- or emulsion-based drilling fluids. However, from the foregoing discussion it will be appreciated that the primary utility of this method will be in wells drilled with oil-based or other nonconducting fluids.

In accordance with the present invention, oil and water can be distinguished from each other by detecting changes in the electrical transients generated by electrical current flow in the polarizing coil for a nuclear magnetism logging tool. These electrical transients are mutually induced between the polarizing coil and the formation during both the switching on and the switching off of the polarizing current flow as well as during the signal reception from precessing protons in the formation. As will be pointed out more fully hereinafter, these electrical transients, as affected by the earth formation and its conductivity, may be sensed in any of several different forms of apparatus. In a preferred form of apparatus, the simultaneous measurement of the fluid content and the electromagnetic properties of the formation is made by polarizing the formation with direct current flowing through the coil. The current is then interrupted and the coil switched from a polarizing circuit to a receiving and a sending circuit which includes amplifier means for transmitting the precession signal to the earth's surface for direct recording. Simultaneously, a portion of the precession signal is amplified and transmitted to at least one induction coil. This induction coil is desirably positioned to generate minimum interference with the precession signal. The electromagnetic property of the formation is then measured by at least one electrical property of the mutual induction reflected in the induction coil as said signal is applied thereto. This electrical characteristic is then recorded in synchronism with the precession signal to present on a single graph and in side-by-side relationship a free fluid and electrical conductivity record of the earth formation. Desirably, the induction coil may include a plurality of coils electromagnetically coupled to each other and the earth formation but physically separated from each other to reduce the interference between the precession signal and the induced electromagnetic signal.

In another embodiment of the invention, the electrical conductivity of the earth formation is detected simultaneously with the measurement of the free fluid content by measuring at least one electrical value that is characteristic of the damping of eddy currents flowing in the polarizing coil. In one form, the eddy currents may be detected by a second coil magnetically coupled with the polarizing coil in the earth formation but physically separated therefrom. In another form, the eddy currents may be detected by the self-induction in the polarizing coil itself when current flow is started therein.

In another embodiment of the invention, an electrical value that is characteristic of damping of eddy current losses in the polarizing coil is detected by modifying the intensity or duration of the polarizing current. The resulting precessional signal will vary in intensity, duration or phase and will represent the electrical value that is characteristic of the damping imposed by the earth formation.

Further objects and advantages of the present invention will become apparent from the following detailed description taken in conjunction with the accompanying drawings which form an integral part of the present specification.

In the drawings:

FIG. 2 is an alternative arrangement for recording simultaneously the free fluid and electromagnetic properties of an earth formation wherein said fluid may be present; the surface control system in this embodiment permits modification of the method of detecting the electromagnetic loading of the formation upon the electrical transients flowing in the polarizing coils.

FIG. 3 illustrates a further alternative of the logging tool useful with a surface system of the type shown in FIG. 2.

FIG. 4 illustrates an alternative arrangement of surface-control circuitry for applying polarizing current to the nuclear magnetism coil and for receiving precessional signals therefrom that include the transient signals representative of the earth formation's electromagnetic properties during said nuclear magnetism signal generation.

Figure 1:
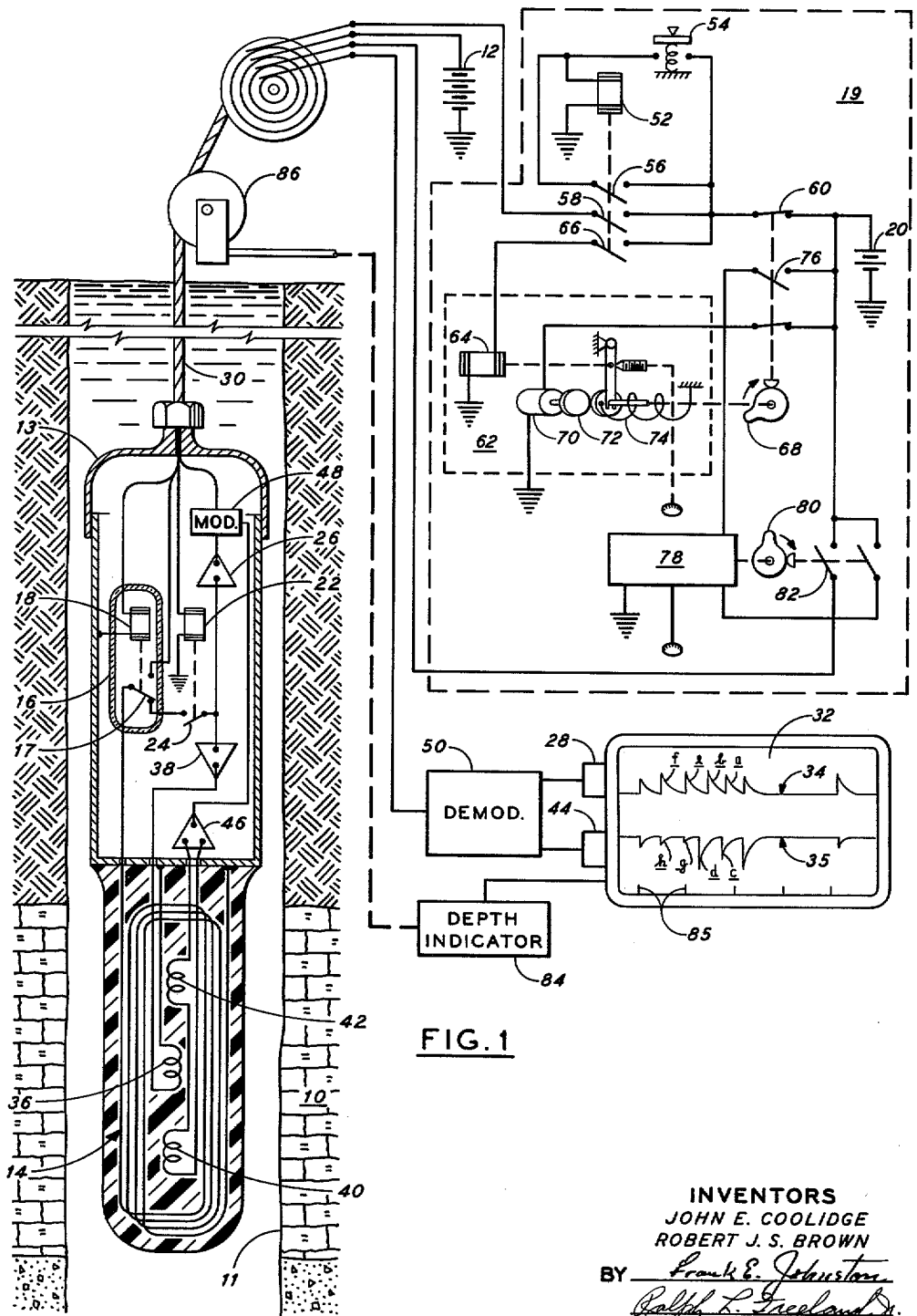
FIG. 1 is a schematic representation of a well logging system wherein the precession signal generated in a nuclear magnetism system is divided so that one portion of the signal may be recorded directly while another portion is amplified for application to an induction logging system.

Referring to the drawings, and in particular to FIG. 1, the present invention is illustrated as being applied to a nuclear magnetism well logging system capable of detecting in an earth formation, such as that illustrated as 10, simultaneously its free-fluid content and its electromagnetic characteristics. As is understood in the art of nuclear magnetism logging, protons (nuclei of the most common isotope of hydrogen) are polarized within fluids in the well bore 11 and in fluids within formation 10 by passing electrical current from battery 12 through polarizing coil winding 14. Control of the polarizing coil from battery 12 to coil 14 is through a vacuum switch 16 so that large current flows may be stopped substantially instantaneously. As understood in this art, "instantaneous" means within 1 to 10 milliseconds. As shown, contact 17 of vacuum switch 16 is operated by relay 18 which in turn is energized from the surface by battery 20 through appropriate relays to be discussed hereinafter.

Upon the interruption of polarizing current flow to coil 14, contact 17 switches polarizing coil 14 from a polarizing to a receiving position, as indicated in FIG. 1. After a suitable time delay for the purpose of permitting switching transients to die out in coil 14, relay 22 through contact 24 applies the precessing signal to an amplifier 26 that is coupled to a recorder 28 through logging cable 30. The output of recorder 28 is directly indicated on graph 32 and in FIG. 1 represented by the line 34.

As is further understood in the field of nuclear magnetism logging, when free fluid is present in formation 10 the polarized protons, after cut-off of current flow in coil 14, precess under the influence of earth's magnetic field and in said precession generate a macroscopic alternating current flow that induces a signal of about 2,000 cycles in coil 14. This induced precession is influenced by the length of time and strength of the magnetic current that flows in coil 14 during polarization. The resulting signal accordingly has an amplitude and a duration dependent upon the polarization history of the nuclei in the formation and the total quantity of protons available to participate in this in-phase precession. In general, the quantity of protons can be directly deduced from the signal intensity and the duration of the signal. When the polarizing current is approximately identical, minor variations in polarization do not greatly influence the signal that is measured.

As indicated hereinbefore, the total number of protons in an earth formation is not alone diagnostic of whether these protons are in hydrocarbons or in water, since the response under equal polarizing conditions will not definitely determine which species is present. This is also true because the numbers of hydrogen nuclei per unit volume in oil and water are approximately the same. Accordingly, it is essential that a further measurement be made of the earth formation to determine at least one other characteristic of the earth formation and its contained fluids to distinguish between oil and water. In accordance with the present embodiment, this distinction is developed by using a portion of the precession signal generated by protons precessing in phase to apply an electromagnetic current to induction coil 36. Induction coil 36 is isolated from the precession-signal generating circuit by amplifier 38. Desirably, amplifier 38 may change the phase of the precession signal or add a standard frequency variation to the 2 KC precession signal. However, the direction of winding of coil 36 as illustrated in FIG. 1 is desirably at 90° to the axis of winding of coil 14, so that there is minimum electrical coupling between these coils. The electromagnetic loading of formation 10 on coil 36 may be measured directly by measurement of a phase shift from a reference signal applied to coil 36. However, in the present embodiment, the electromagnetic loading of formation 10 is more simply measured by positioning a pair of receiving coils 40 and 42 above and below induction coil 36. Mutual induction between coils 36, 40 and 42 will, of course, be directly related to the electromagnetic properties of formation 10. One electrical property of the signal induced in coils 40 and 42 is then transmitted by amplifier 46 to the earth's surface for recording by indicator 44 on graph 32. For the purpose of simplifying the signal transmission of the precession signal and the electrical characteristic that is representative of the electromagnetic loading of formation 10, the signals from amplifiers 46 and 26 may be multiplexed through cable 30 by modulator 48. Demodulation of the signal into its separate components is then performed at the earth's surface by demodulator 50.

As mentioned above, the timing of the polarization current through coil 14, the signal reception time for precessing protons in the same coil, and the time delay for transmission of both the precession signal and the electromagnetic induction signal are under the control of a timing device, indicated generally as 19. Timing device 19 includes a master control relay 52 which is energized by battery 20 through starting switch 54, and can be locked in by its own contact 56 when push button 54 is momentarily closed. Closing of relay 52 also closes contact 58 which, through a normally closed contact 60, under the control of timing switch 62, energizes relay 18 to start the polarization current in coil 14. Relay 64 of timing switch 62 is energized through contact 66 of relay 52. Closing of relay 64 couples a rotating cam 68 to drive motor 70 through a clutch 72. The setting of tension on spring 74 regulates the time required for cam 68 to be rotated by motor 70 to open contact 60 to end the polarization current flow in coil 14. Cam 68 also closes contact 76, which energizes a time-delay relay 78 of the same general type as timer 62. A preset time delay may thus be established for measuring the precession signal after the switching transients have decayed in coil 14. For this purpose, the rotation of cam 80 closes contact 82 in the control circuit for signal-switching relay 22. Relay 22 in turn connects the precession signal from coil 14 to amplifiers 26 and 38 through relay contact 24.

As indicated generally by the depth indicator 84, the position of the logging sonde 13 in well bore 11 identifies the depth of formation 10 and is measured by the length of cable 30 through a mechanical coupling identified as 86. As indicated schematically, depth indicator 84 is arranged to mark graph 32 with indications 86 which correspond to the depth of the logging tool. The curves 34 and 35, as suggested above, respectively represent the free fluid and the induced electromagnetic conduction of earth formations encountered along the well bore.

As an example of the interpretation of these curves, peaks $a$ and $b$ of curve 34 on graph 32 have counterparts in the peaks $c$ and $d$ in curve 35. Accordingly, these peaks are representative of a formation containing free fluid as represented by the peaks $a$ and $b$, but the formations are also deducible to contain salt water, or other conductive fluids, by virtue of the peaks $c$ and $d$ having comparably large amplitudes in curve 35. On the other hand, the peaks $e$ and $f$ in curve 34 do not have corresponding amplitudes in the peaks $g$ and $h$ in curve 35. Hence, the formations producing curves $e$ and $g$, and $f$ and $h$, are indicative of an insulating or nonconducting, fluid-containing formation which may be inferred to be an oil- or fresh-water-producing horizon.

There is shown in FIG. 2 an alternative arrangement for simultaneous detection on a nuclear magnetic precession signal and an electrical signal representative of changes in electrical currents flowing in a nuclear magnetism polarizing coil, as said flow is affected by the electro-magnetic loading of the earth formation under investigation. As in the previous embodiment, the purpose of such simultaneous measurement is to distinguish oil from water using a drilling fluid whose electrical properties are not suitable for the standard electric logging procedures, or wherein the lithology of the formations is too complex for simple self-potential and resistivity measurements to distinguish directly between oil- and water-bearing formations. As in the embodiment of FIG. 1, the logging sonde 13A includes a nuclear magnetism polarizing coil 14 which may be connected to a source of polarizing current, such as battery 12, through a vacuum switch 16 in substantially the same manner as in the system of FIG. 1. However, as distinguished from FIG. 1, there is magnetically coupled to polarizing coil 14 a different form of induction coil 36A. In the present instance coil 36A may have its principal axis of winding parallel, or coincident, with coil 14. The purpose of coil 36A is to detect electrical transients during the period of time when polarizing current is first applied to the earth formation. This initial polarizing current will be affected by the electromagnetic loading of the earth formation adjacent to coil 14. Since in the present embodiment the electrical transient representative of the electromagnetic conduction of the earth formation is measured during the initial part of a polarizing current flow, a single amplifier 26A may be used for transmitting both the precession signal and the electromagnetic induction signal to recorders 28A and 44A. As indicated, amplifier 26A is selectively switched between coil 14 and coil 36A by a differential relay, identified as 23. Relay 23 controls the position of contact 25 and is indicated as having a neutral, center position for disconnecting amplifier 26A from both coils 14 and 36A. The purpose of this neutral position is to disconnect amplifier 26A during a substantial portion of the polarizing current flow. Thus, upon application of the D.C. polarizing current to coil 14, which has inherent resistance, inductance and capacitance, an alternating current transient is generated in both coils 14 and 36A. These transient signals die out as the polarizing current flow continues. In this way, before the precession signal is generated and applied to recorder 28A, the polarizing field is essentially unidirectional. Comparable switching of the output of amplifier 26A between recorders 28A and 44A is accomplished at the earth's surface through contact 27 of relay 29. The control circuit, for timing both the polarizing and reading circuits, is indicated generally as 19A.

In the embodiment of FIG. 2, control circuit 19A provides a circuit similar to 19 of FIG. 1, with the exception that more than one polarizing current may be transmitted to coil 14 from battery 12. Battery 12 is adapted to apply full current to coil 14 through contact 21A of relay 21. A reduced current may be applied through contact 21B. As shown, the reduction in current is obtained by connecting contact 21B to the output of battery 12 through a current-limiting resistor 31. The purpose of the foregoing arrangement is to permit two current conditions to be established through polarizing coil 14, which in turn will produce two different polarization field conditions for protons in surrounding formation 10.

As is understood in the art of nuclear magnetism logging, such different polarizing conditions can be used for directly investigating the relaxation rate for a particular fluid that may be found present in the formation. In practice, the currents are applied by first energizing coil 14 with the full polarizing current from source 12, and after a prescribed period of time a reduced current of the same polarity is transmitted through the coil. With varying periods of either the main polarizing current, known as $I_P$, or the low field conditions known as $I_L$, different relaxation conditions can be imposed on the protons before they are permitted to precess under the influence of earth's magnetic field. Successive variations, preferably in the $I_L$ time, are used to plot a rate curve for the nuclear polarization. In the present embodiment, the $I_L$ time may be eliminated entirely. In that case, relay 21 moves its contact 21C out of engagement with contact 21A, and the precessional signal is read without further energizing coil 14. However, as will be explained in connection with the arrangement shown in FIG. 4, two different precessional signals that can be induced by varying the polarizing condition may also be used as a direct measurement of the electromagnetic loading of the earth formation on the polarizing coil. Accordingly, for the completeness of the apparatus shown in FIG. 2, there are included both an $I_P$ timer, designated generally as 35, and an $I_L$ timer, designated generally as 35, and $I_L$ timer, designated generally as 37. As further indicated, the master control relay 39 controls the starting of timers 35 and 37 in substantially the same manner as that described in connection with timers 62 and 78 in FIG. 1.

In the present embodiment, the timers 35 and 37 may be used, whether the polarization condition is varied or not, to operate the differential relay 23, so that amplifier 26A is connected to the respective induction and nuclear magnetism recorders 44A and 28A at the proper time. As stated hereinbefore, it is necessary in the embodiment of FIG. 2A to connect the recorder 44A to amplifier 26A during the initial part of the $I_P$ condition. For this reason, the upper portion 23A of relay 23 is energized through a normally close contact 41 that is arranged to be opened shortly after polarization begins, but after the induced transient electrical current has been damped out by cam 43 under the control of $I_P$ timer 35. The initiation of control current to section 23A is under the control of cam 45 of timer 35 and begins at the same time polarization current is applied to coil 14. Thus, induced current flow in induction coil 36A is connected through relays 23 and 29 to record its output on chart 47 as curve 49 during the initial part of the polarization period. It will be observed, as mentioned before, that contact 25 of relay 23 returns to its central position when contact 41 opens, so that during the intervening period for polarization of protons in fluids around the well bore amplifier 26A is disabled. At the end of the polarizing period, which is under the control of the lobe 45A on cam 45, contact 51 opens so that closing of contact 53 by rotation of cam 55, also operated by timer 35, can move contact 21C of the polarizing relay to the $I_L$ position. The length of time that the $I_L$ current is applied is controlled by contact 57 operated by cam 59 under the control of $I_L$ timer 37. As indicated above, this time may be set to zero by proper adjustment of cam 59. $I_L$ timer 37 also controls connection of the precession signal to recorder 28A through coil 23B of differential relay 23. In controlling this connection, cam 61 may be adjusted to close contact 63 for read out of the precession signal after the switching transients have died out in coil 14.

There is shown in FIG. 3 an alternative arrangement for measuring the electromagnetic properties of the earth formation by detecting electrical transients induced directly in the polarizing coil. In this embodiment, which is similar to FIG. 2, a current transformer 91 is positioned to detect current flow through the supply line for coil 14. Since the current will vary in accordance with the transients established in the coil, there is induced in secondary winding 93 of transformer 91 a signal that will be modified by the electromagnetic conduction of the earth formation adjacent which the coil 14 is positioned.

FIG. 4 is an alternative arrangement wherein the nuclear magnetic properties, and the conduction of the earth formation, may be detected simultaneously by measuring the inductive effect on the polarizing current and the resulting precessional signal when two or more polarizing conditions are applied to the protons in the surrounding earth formation. Specifically, we have found that when a conductive formation surrounds the polarizing coil, the initial amplitude of the precessional signal will vary in accordance with the history of the polarizing current. For this reason, there is provided by the circuit of FIG. 4 an apparatus for comparing the amplitudes either at the initial part of the precessional signal recording or at some other selected time interval. Accordingly, the arrangement of FIG. 4 presents a record 32B of the free-fluid content, such as curve 49A, detected by one electrical characteristic of the precession signal where it can be compared directly to curve 47A, representing the ratio of the amplitudes of the same recorded signal to another precession resulting from a different polarizing condition.

As indicated in FIG. 4, the timing of the polarizing current is under the control of the $I_P$ timer 35B and the $I_L$ timer control relay 114 and energizes the $I_P$ polarization circuit for differential relay 21 through contacts 114a and 100b. The time interval for $I_P$ polarization is selected by setting cam 116 of $I_P$ timer 35B. When cam 116 has rotated to lift its follower, switch 118 opens, and $I_P$ control relay 114 is de-energized through its holding contact 114b.

At a time after $I_P$ polarization current flow ends in the logging coil, as by cam 120 of $I_P$ timer 35B, the follower for cam 120 closes switch 122 to energize readout control relay 124 through contact 100c of $I_P$-Only relay 100. At the same time, relay 124 closes switch 124b to energize line 125, which is connected to the coil-switching relay (not shown) in the logging sonde. Thus, with the coil-switching relay in the logging sonde actuated, the nuclear precession signal may be transmitted over line 127 for recording on graph 32B as curve 49A. This is accomplished by transferring contact 128 from its normally open to its closed position by the energizing of relay 129 through contact 124a. With line 127 switched in this manner, the signal of the $I_P$-Only polarization is jointly applied to the $I_P$ recorder 130 and to an $I_P$ storage unit 131. The $I_P$ recorder 130 draws the curve 49A as each reading is made. As indicated above, this reading represents the free-fluid content of the earth formation. The information retained in $I_P$ storage unit 131 is used for developing the ratio of the nuclear magnetism precession signal under a different inductive loading when the field polarization is varied on the formation under study. As indicated schematically, the $I_P$ to $I_P I_L$ ratio is displayed by curve 47A on graph 32B by recorder unit 132. The latter unit is arranged to measure the ratio when it is supplied not only from the $I_P$ storage unit 131 but also with information from the $I_P I_L$ storage unit 133.

The development of the $I_P I_L$ polarization will now be described. Such information is developed on alternate half-cycles by the rotation of motor 96 to bring cam 98 into a position so that the cam follower opens switch 98a and closes switch 98b so that relay 102 is operated and relay 100 is opened. The closing of relay 102 again energizes $I_P$ timer 35B through contact 102b. Operation of cam 110 lifts switch 112 to actuate $I_P$ control relay 114 in the same manner as described in connection with the $I_P$-Only cycle. However, in the present instance the $I_P$ polarizing time is controlled through contact 102c. Further as distinguished from the $I_P$-Only cycle, rotation of cam 116 closes switch 135 at the same time that switch 118 is opened. Closing of switch 135 immediately transfers control of relay 21 to $I_L$ timer 37B. As shown, the momentary closing of contact 135 energizes $I_L$ control relay 137 so that it closes contact 137a to switch relay 21 to its low field generating position for the polarizing coil in the logging sonde. At the same time, contact 137b closes to hold relay 137 in its energized condition and maintain current flow to $I_L$ timer 37B. The time during which the low polarizing field current is applied is under the control of cam 139 of $I_L$ timer 37B. Rotation of cam 139 may be adjusted to make this time any desired amount. At the end of the $I_L$ polarizing time, cam 139 opens switch 140 to open relay 137.

Timer 37B continues to operate when switch 140 dwells in its open position and connects contact 146 to line 147. When contact 146 is energized, relay 148 closes its contact, after a brief time delay, to re-energize timer 37B. The time delay is made only long enough to let relay 137 open. Cam 141, also operated by timer 37B, controls the time at which the precession signal can be read by supplying current to line 125 to energize the coil-switching relay in the logging sonde. The signal generated by the nuclear magnetism precession is transmitted over line 127 through normally closed contact 128 of relay 129 to $I_pI_L$ storage unit 133. The end of the cycle for $I_L$ timer 37B is under the control of cam 143 and switch 144.

At the end of each half-cycle, controlled by motor 96 and cam 98, both $I_p$ timer 35B and $I_L$ timer 37B are reset by cam 150, also driven by motor 96, closing reset switch 152.

From the foregoing examples, it will be apparent that the present invention provides several different forms of apparatus for measuring simultaneously the free-fluid content and the electrical conductivity of an earth formation while using circuitry heretofore used only to develop a nuclear magnetism logging signal representative of free-fluid content. As brought out in the many embodiments discussed above, the transient currents generated during polarization and precession are used as a measure of the electromagnetic loading imposed by the earth formation. The changes in the transient responses during such polarization and precession are then recorded for direct comparison with the free-fluid content for the establishment of the difference between oil and water in earth formations independently of the electrical conductivity of the drilling fluid.

Various modifications in both the apparatus and the method of application of this invention will become apparent to those skilled in the art from the foregoing description. All such modifications and changes within the scope of the appended claims are intended to be included therein.

We claim:

1. The method of simultaneously determining the fluid content and the conductivity of earth formations traversed by a well bore which comprises positioning a polarizing coil in said well bore adjacent an earth formation, initiating a unidirectional current flow through said coil to establish a polarization field in and around said well bore, continuing the application of said current for a period of time sufficient to polarize a representative sample of protons therein and to permit damping of eddy currents established by said polarizing current, interrupting said unidirectional current flow to permit nuclei polarized thereby to precess under the influence of earth's magnetic field, measuring at least one electrical value characteristic of the alternating current induced in said coil by said protons precessing in phase, said measurement being made during a period of time beginning after interruption of said current flow and after the eddy currents mutually induced between said formation including its contained water and said coil have been damped in said coil, and detecting another electrical value characteristic of the damping of eddy currents mutually induced in said earth formation by current flow in said coil as a measure of the conductivity of said earth formation, said other electrical value being measured during a period beginning with interrupting of said unidirectional current flow in said coil and ending before said eddy currents are damped in a subsequent polarizing period, and simultaneously recording said electrical values characteristic of eddy current damping and said nuclear precession current in accordance with the depth of said polarizing coil in said well bore.

2. The method in accordance with claim 1, wherein said electrical value characteristic of the damping of eddy currents is detected upon initiation of current flow.

3. The method in accordance with claim 2, wherein said electrical value is detected by positioning a second coil adjacent said polarizing coil and detecting the induced current flow therein.

4. The method in accordance with claim 2, wherein said electrical value is detected by the self-induction in said polarizing coil when current flow is initiated therein.

5. The method in accordance with claim 1, wherein the interruption of current flow in said polarizing coil is reduced in magnitude and said electrical value characteristic of the damping of eddy currents is measured by the ratio of said same electrical characteristic of said signal generated when the current in said polarizing coil is interrupted without reduction in magnitude.

6. The method in accordance with claim 1, that includes at least simultaneously during said in-phase precession of protons applying an alternating current signal to said polarizing coil at a substantially different frequency than the frequency of said proton precession, and said electrical value characteristic of the damping of the eddy current losses is measured by detecting variations in the loading on said alternating current signal by the formation and fluids adjacent to said coil.

7. The method in accordance with claim 6, wherein a separate pickup coil is positioned adjacent said polarizing coil for detecting said electrical characteristic by measuring a characteristic of the alternating current signal, and said coil is tuned to said different frequency.

8. The method in accordance with claim 1, wherein said simultaneous detection of said electrical value characteristic of the damping of eddy currents includes power amplifying at least a portion of said precessional signals, feeding back said amplified signal into said earth formation through another coil positioned adjacent said polarizing coil and measuring an electrical characteristic of the modification of said precessional signals by detecting an electrical value characteristic of said feed-back current.

9. The method of recording simultaneously the fluid content and an electromagnetic characteristic of an earth formation traversed by a well bore which comprises positioning a nuclear magnetism polarizing coil in said well bore adjacent an earth formation, initiating a direct current flow through said coil to polarize protons in formation fluids around said bore hole, continuing the application of said current flow to polarize said protons until electrically transient signals mutually induced in said formation and said coil by initiation of said current flow have decayed, abruptly interrupting said current flow to permit said polarized protons to precess in unison about earth's magnetic field to induce a nuclear magnetism signal in said coil, delaying the detection of said induced nuclear magnetism signal until the electrically transient signals mutually induced in said formation and said coil by said current interruption have decayed, then detecting an electrical characteristic of the signal induced in said coil by in-phase precession of said protons as a measure of the fluid content, and during at least one of said electromagnetically induced transient conditions detecting an electrical value characteristic of the signal mutually induced between said coil and said formation as a measure of the electromagnetic properties of said formation.

10. The method of recording simultaneously the fluid content and an electromagnetic characteristic of an earth formation traversed by a well bore containing an electrically nonconducting fluid which comprises positioning at least a nuclear magnetism polarizing coil in said well bore adjacent an earth formation, initiating a direct current flow through said coil to polarize protons in formation fluids around said bore hole, continuing the application of said current flow to polarize said protons until eddy currents mutually induced in said formation and said coil by initiation of said current flow have decayed, abruptly interrupting said current flow to permit said polarized protons to precess in unison about earth's magnetic field to induce a nuclear magnetism signal in said coil, delaying the detection of said induced nuclear magnetism signal until the eddy currents mutually induced in said formation and said coil by said current interruption have decayed, then detecting an electrical characteristic of the signal induced in said coil by in-phase precession of said protons as a measure of the fluid content, and during at least one of said electromagnetically induced transient conditions detecting an electrical value characteristic of the signal mutually induced between said coil and said formation as a measure of the electromagnetic properties of said formation.

11. Apparatus for distinguishing between oil and water in an earth formation penetrated by a well bore by simultaneously measuring the fluid content and the electromagnetic properties of said formation which comprises a polarizing coil, a source of direct current, switch means for applying direct current from said source to said polarizing coil and for switching said coil from said source to a detecting system, said detecting system including amplifier means for sending a precession signal detected in said coil to the earth's surface, means for feeding a portion of said precession signal from said amplifier means to an induction coil means, said induction coil means being positioned adjacent said polarizing coil but magnetically isolated therefrom, means for detecting modifications of electrical current flow in said induction coil means when said signal is applied thereto as a measure of an electromagnetic property of said earth formation, and means for recording variations in both said precession signal from said polarizing coil and electrical current flow in said induction coil means on a common record as a measure of said fluid content and said electromagnetic properties.

12. Apparatus in accordance with claim 11, wherein said induction coil means includes a plurality of coils whose magnetic axes are perpendicular to the axis of said polarizing coil for impressing and detecting nuclear magnetism signals, and means for frequency modifying said portion of said precession signal fed to said induction coils to prevent interference between the precession signals and the induced electromagnetic signals representative of said earth formation.

References Cited in the file of this patent
UNITED STATES PATENTS

| 2,018,080 | Martienssen | Oct. 22, 1935 |
| 2,401,280 | Walstrom | May 28, 1946 |

FOREIGN PATENTS

| 1,015,954 | Germany | Sept. 19, 1957 |

OTHER REFERENCES

Brown et al.: Journal of Petroleum Technology, vol. 8, November 1956, pages 262 to 264.

Disclaimer 3,004,212.—*John E. Coolidge*, Arlington Heights, Ill., and *Robert J. S. Brown*, Fullerton, Calif. INDUCTION AND NUCLEAR MAGNETISM LOGGING. Patent dated Oct. 10, 1961. Disclaimer filed Sept. 24, 1964, by the assignees, *Borg-Warner Corporation* and *California Research Corporation*.

Hereby enter this disclaimer to claim 5 of said patent.

[*Official Gazette December 22, 1964.*]